JOSEPH HOEFLINGER.

Improvement in Attaching Knobs to thier shanks.

No. 123,102.　　　　　　　　　　　Patented Jan. 30, 1872.

WITNESSES:　　　　　　　　　　INVENTOR:
Robert Burns　　　　　　　　　　Joseph Hoeflinger.
Jno. Williams　　per.　　　　　Herthel & Co
　　　　　　　　　　　　　　　　Attys.

123,102

UNITED STATES PATENT OFFICE.

JOSEPH HOEFLINGER, OF ST. JOSEPH, MISSOURI.

IMPROVEMENT IN ATTACHING KNOBS TO THEIR SHANKS.

Specification forming part of Letters Patent No. 123,102, dated January 30, 1872.

*To all whom it may concern:*

Be it known that I, JOSEPH HOEFLINGER, of St. Joseph, in the county of Buchanan and State of Missouri, have made certain new and useful Improvements in Fastening Door-Knobs to their Shanks; and I do hereby declare that the following is a full and true description thereof, reference being had to the accompanying drawing and to the letters of reference marked thereon.

The nature of this invention relates chiefly in securing the knob-shanks by hook wires to the knob proper, in a manner hereafter more fully described.

Figure 1:
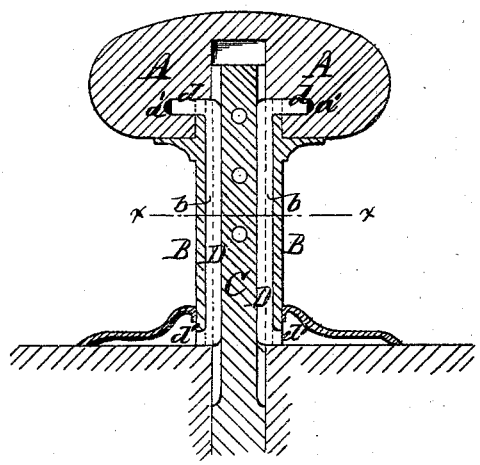
Figure 2:
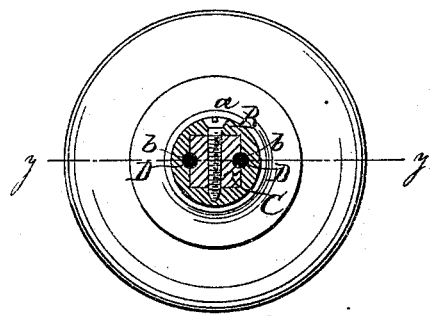

To enable those skilled in the art to make and use my said improvements, I will now more fully describe the same, referring to Figure 1 as a longitudinal section on line $yy$ of Fig. 2, and Fig. 2 as a transverse section at line $xx$ of Fig. 1.

The knob A has a square recess for the reception of the shank B. The shank B is provided with a square-shaped hole for the reception of the spindle C, this being secured to said shank by screw $a$, as in other door-knobs. In order, however, to secure the shank B firmly to its knob A, I provide the shank B with longitudinal side grooves $b\ b$, respectively. In said grooves the locking-bars or wires D are inserted. (See Figs. 1 and 2.) The wires D have their ends bent to form hooks $d$, fitted to enter the holes or recesses $a'$ in the knob A. The opposite ends $d'$ of said wires, however, are simply bent up against the inner end of the shank B, as clearly shown in Fig. 1. The hook-wires D, thus constructed, are placed in the grooved shank B, and the parts are properly inserted in knob A. The spindle C is next readily inserted in and secured to its shank B by screw $a$.

It will be noticed that the wires D, by their hooked ends, lock the shank to its knob, a disengagement being prevented by the spindle C, which is firmly secured to the shank.

The construction and arrangement are such that the door-knobs are secured to the shanks in a more cheap and efficient manner; also, that the parts can be readily disengaged for repairs, as well as replaced and secured.

Having thus fully described my said invention, what I claim is—

As a fastening for door-knobs, the bent or hooked wires D, arranged in combination with shank B and spindle C, when formed with side grooves $b\ b$ and knob A, substantially as and for the purpose set forth.

In testimony of said invention I have hereunto set my hand.

JOSEPH HOEFLINGER.

In presence of—
WILLIAM GLEITZE,
CHARLES NOLL.